US007867075B2

(12) United States Patent
Irwin, Jr. et al.

(10) Patent No.: US 7,867,075 B2
(45) Date of Patent: Jan. 11, 2011

(54) GAME APPARATUS

(75) Inventors: Kenneth E. Irwin, Jr., Dawsonville, GA (US); Gary R. Streeter, Andover, MA (US)

(73) Assignee: Scientific Games International, Inc., Alpharetta, GA (US)

(*) Notice: Subject to any disclaimer, the term of this patent is extended or adjusted under 35 U.S.C. 154(b) by 81 days.

(21) Appl. No.: 10/590,622

(22) PCT Filed: Apr. 26, 2006

(86) PCT No.: PCT/US2006/015819

§ 371 (c)(1),
(2), (4) Date: Aug. 24, 2006

(87) PCT Pub. No.: WO2006/116501

PCT Pub. Date: Nov. 2, 2006

(65) Prior Publication Data

US 2007/0178956 A1 Aug. 2, 2007

Related U.S. Application Data

(60) Provisional application No. 60/675,186, filed on Apr. 27, 2005.

(51) Int. Cl.

| | |
|---|---|
| ***A63F 9/24*** | (2006.01) |
| ***A63F 13/00*** | (2006.01) |
| ***G06F 17/00*** | (2006.01) |
| ***G06F 19/00*** | (2006.01) |

(52) U.S. Cl. .................... 463/17; 273/148 R; 273/149; 273/274; 273/292; 283/83; 283/100; 283/901; 283/903; 235/375; 235/381; 463/19; 463/44; 463/46

(58) Field of Classification Search .................... 463/17
See application file for complete search history.

(56) References Cited

U.S. PATENT DOCUMENTS

| | | | | |
|---|---|---|---|---|
| 4,455,025 A * | 6/1984 | Itkis | 273/237 |
| 4,582,324 A | 4/1986 | Koza et al. | |
| 4,669,729 A * | 6/1987 | Solitt et al. | 463/18 |
| RE32,480 E * | 8/1987 | Bolan | 463/19 |
| 5,110,129 A | 5/1992 | Alvarez | |
| 5,356,144 A * | 10/1994 | Fitzpatrick et al. | 463/22 |
| 5,569,082 A | 10/1996 | Kaye | |

(Continued)

FOREIGN PATENT DOCUMENTS

WO WO 95/35216 12/1995

(Continued)

OTHER PUBLICATIONS

PCT Search Report, Apr. 28, 2008.

*Primary Examiner*—John M. Hotaling, II
*Assistant Examiner*—Paul A. D'Agostino
(74) *Attorney, Agent, or Firm*—Dority & Manning, P.A.

(57) ABSTRACT

Described is a player activated game system, particularly adapted for playing instant lottery type games, that includes a game device having a computer containing at least one game, an electronic display and a card interface adapted to receive a game card having data that represents a particular game outcome such that connection of the card to the interface can result the game being played by the device with the particular outcome displayed on the display.

13 Claims, 9 Drawing Sheets

U.S. PATENT DOCUMENTS

| | | | | | |
|---|---|---|---|---|---|
| 5,621,200 | A * | 4/1997 | Irwin et al. | 235/375 |
| 5,709,603 | A | 1/1998 | Kaye | |
| 5,893,797 | A * | 4/1999 | Marino et al. | 463/46 |
| 5,949,042 | A * | 9/1999 | Dietz et al. | 235/375 |
| 5,959,281 | A * | 9/1999 | Domiteaux | 235/454 |
| 5,997,044 | A | 12/1999 | Behm et al. | |
| 6,309,298 | B1 * | 10/2001 | Gerow | 463/20 |
| 6,379,742 | B1 * | 4/2002 | Behm et al. | 427/7 |
| 6,616,531 | B1 * | 9/2003 | Mullins | 463/19 |
| 6,752,319 | B2 * | 6/2004 | Ehrhart et al. | 235/486 |
| 6,789,802 | B2 * | 9/2004 | Hornia | 273/308 |
| 7,347,776 | B2 * | 3/2008 | Wright | 463/17 |
| 2001/0019193 | A1 * | 9/2001 | Gumina | 273/139 |
| 2002/0109295 | A1 | 8/2002 | Browne et al. | |
| 2002/0193157 | A1 * | 12/2002 | Yamada et al. | 463/9 |
| 2004/0162131 | A1 * | 8/2004 | Shuster | 463/17 |
| 2004/0235550 | A1 | 11/2004 | McNally et al. | |
| 2004/0259631 | A1 * | 12/2004 | Katz et al. | 463/25 |
| 2009/0075713 | A1 * | 3/2009 | Hartman et al. | 463/19 |

FOREIGN PATENT DOCUMENTS

| | | |
|---|---|---|
| WO | 2004/110578 | 12/2004 |

* cited by examiner

GAME APPARATUS

FIELD OF THE INVENTION

The invention generally relates to game and lottery systems, and more particularly to systems using game cards such as instant lottery tickets.

BACKGROUND OF THE INVENTION

With respect to lotteries, scratch-off or instant win lottery tickets have been a staple of the lottery industry for decades. They have been enjoyed by billions of players over the world for years. Innovations in instant win ticket game design have sustained the product and allowed for growth. Though, recently the instant win lottery ticket market sales increases have become relatively flat.

One method of combating this undesirable trend is to produce higher payout instant win tickets. However, most lottery jurisdictions regulate payout percentages by charter and therefore cannot utilize higher payout tickets as a means of increasing sales. It is therefore desirable to develop a new methodology of marketing instant win lottery tickets where the player perceives added value independent of increases in payout percentages.

Another method is to expand the distribution of instant tickets to new locations like super market checkout lanes. However, the logistics and security problems associated with placing instant lottery tickets in super market check out lanes has hitherto made this expanded distribution impractical.

A third method is to enlarge the instant ticket to expand the limited amount of play (a.k.a. scratch-off) area to create an extended play experience. These larger tickets permit larger or multiple play areas (e.g., Bingo games). But, the physical size of a ticket can be increased only by a limited amount. Typically the largest tickets measure 4×10 inches and, at that size, are cumbersome. The players often perceive that the playing time does not reflect the higher cost of larger tickets.

Yet another method is to create a small electronic game device on which an instant lottery type game can be played. In one case a game along with a predetermined win outcome for the game is programmed into a microprocessor prior to assembly of the device by connecting ports of the microprocessor to selected tracks on a printed circuit board as described in U.S. Patent Application, Publication No. US 2004/0235550.

SUMMARY

It is one object to describe a player activated game system that overcomes at least some of the disadvantages of the products referenced above.

DETAILED DESCRIPTION

Figure 1:
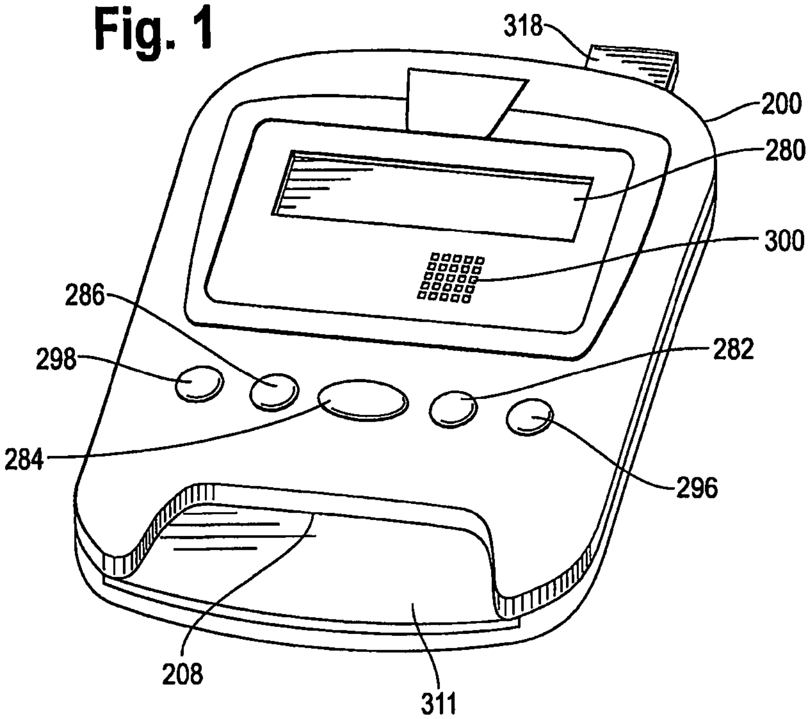
FIG. 1 is a front perspective view of a first player activated electronic validation machine.

FIGS. 1-5 depict a first embodiment of a player activated game system. For simplicity the system described herein reflects one embodiment or application of the overall system concept. For purposes of this description, the exemplary embodiment of FIGS. 1-5 is described in the context of a lottery application. Specifically to illustrate some of the system concepts and components of the system, a game system is described that can play like a conventional instant lottery ticket game that utilizes an electronic game device 200 as a player activated electronic validation machine ("EVM") in combination with game cards formatted as instant lottery tickets. For convenience and consistency of description, the term EVM is used herein even though the EVM might not perform validation functions per se. There are other applications of the system and its components including, for example, coupon and recreational games. This particular embodiment of the system of FIGS. 1-5 includes the EVM 200 shown in FIG. 1 and what is effectively an instant type lottery ticket 202 having a front surface 204 shown in FIG. 2 and a back surface 206 shown in FIG. 3. As an example of one mode in which the system can operate, a player would purchase one or more of the tickets 202; insert one of the tickets 202 into a ticket receiving slot 208 configured in the EVM 200; and preferably play a computer type game on the EVM 200 in which the outcome or prize value is predetermined by information contained on the instant ticket 202. Preferably, the player activated EVM 200, is a relatively small, inexpensive electronic device, that can be used in conjunction with printed instant type lottery tickets, such as the ticket 202 and that also can be designed to receive and validate a variety of lottery type tickets such as standard 2"×4" instant lottery ticket.

Figure 4:
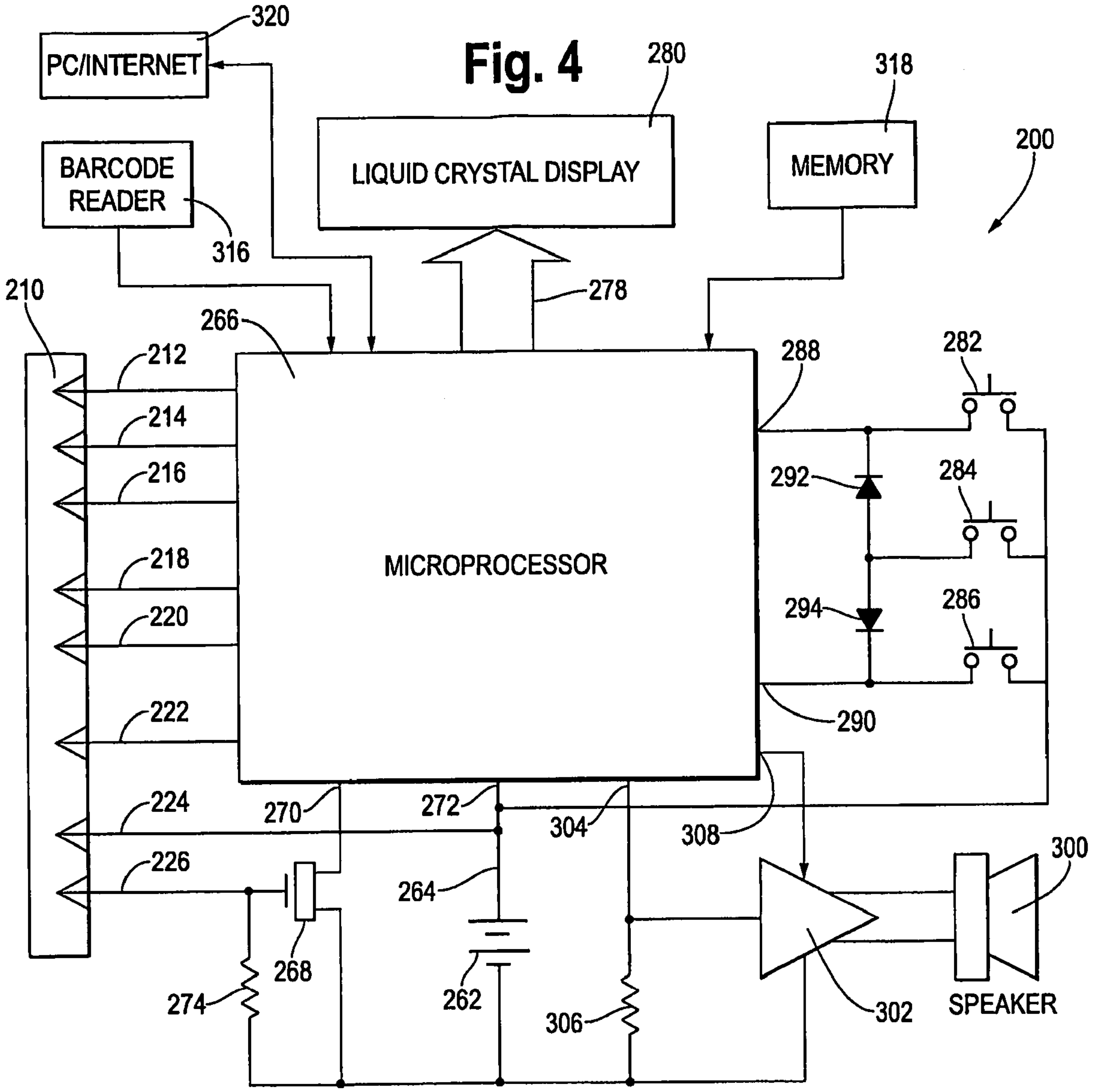
FIG. 4 is a schematic diagram of the components of the electronic validation machine of FIG. 1.
Figure 5:
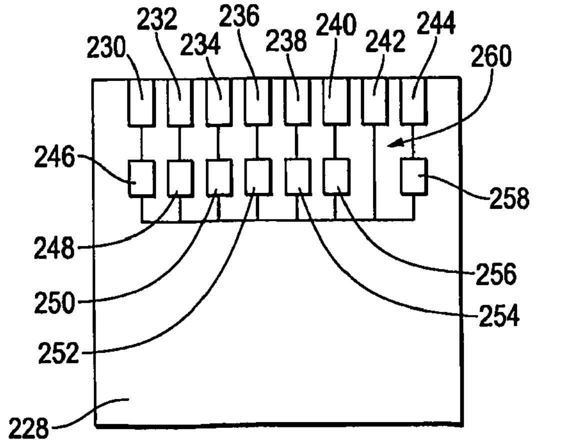
FIG. 5 is a schematic diagram of circuits printed on the substrate of the lottery ticket of FIG. 1.

FIGS. 4 and 5 illustrate in schematic form one of a plurality of possible architectures for the EVM 200 and the lottery ticket 202 respectively. Here, the EVM 200 includes a connector 210 having a set of interface connections or contacts 212-226 to interface with and obtain electronic signatures from the lottery ticket 202. Printed in conductive ink on a substrate 228 of the ticket 202 are a set of eight contacts 230-244 that are configured to interface directly with the contacts 212-226 of the EVM connector 210. In this example of the ticket 202, a set of electrical impedances 246-258 are also printed in conductive ink on the substrate 228 and are connected on the substrate 228 to the contacts 230-244 by a set of printed conductive lines indicated at 260. The methods of printing and the composition of the conductive elements such as 230-244 and 246-258 and the conductive line 260 can be selected using the criteria described above used in the printing of conductive elements on a substrate. However, because the conductive elements 246-258 will, preferably, vary from ticket to ticket, it might be desirable to use an imaging type printing process such as an inkjet printer to (selectively) print the elements 246-258. In one alternative, printing methods such as flexographic and intaglio, including gravure, can be used to produce sets of tickets 202 having identical conductive elements such as the elements 230-260. Then a high intensity laser can be used be used to (selectively) cut some of the appropriate conductive elements 246-258 so that the information contained in the elements 246-258 corresponds to the information printed in a barcode 310 or 314 on ticket 202. In one example, the conductive elements 246-258 can be cut to reflect the winning amount or prize as specified in the barcode 310 if the ticket 202 is a lottery ticket.

For an application of this nature, a driving source, here a battery 262 in the EVM 200, is connected to the contact 224 via a line 264 and is effective to create the electronic signatures used to transfer information from the ticket 202 to the EVM 200. It will be appreciated, that while the embodiments of the EVM 200 and the ticket 202 contemplate direct physical contact of the contacts 212-226 with the contacts 230-244, other types of electrical contacts or signal transmission arrangements can be used such as the techniques described above that include capacitive, inductive, RF or other wireless methods or even in some circumstances an optical contact can be used. The electronic signatures so obtained via the contacts 212-226 can then be used to impart particular information to a microprocessor 266 in the EVM 200. This information can include a wide variety of data such as: the type of game to be played; the predetermined prize level of the game; the status of the ticket 202; the presence or absence of the ticket 202 in the slot 208 as well as other game or ticket parameters as might be required for a specific game or games.

As an example of the operation of the EVM 200, the interface connection 226, when supplied with a predetermined signature, either voltage or current, from the ticket 202 generated in part by the impedance 258, applies a control signal to a Field Effect Transistor ("FET") 268 which, in turn, connects the battery 262 to the a pair of power connections 270 and 272 of the microprocessor 266. In the absence of this electronic signature, the FET 268 is biased to an 'OFF' state by means of a resistor 274 and the microprocessor 266 is disconnected from the power source 262. When the FET 268 is initially turned on, the microprocessor 266 is caused to reset to its initial, power on state. A set of software contained within the microprocessor 266 in this embodiment or in other locations such as an external memory 318 causes the microprocessor 266 to examine several of its input ports that are connected to the contacts 212-222 for electronic signatures. The input ports connected to contacts 218 and 220, for example, examine ticket impedances 252 and 254 for the electronic signatures that determine the type of game represented by the particular ticket 202. In this particular case, because there are two connections to the microprocessor 218 and 220, this example would encode a maximum of 4 games if a binary signature is employed. For a binary signature, the impedances 252 and 254 can be the presence or absence of a resistance. However, significantly more than 4 games can be encoded by using several different discrete values for the impedances 252 and 254. As an example, assume the impedance 252 can have any one of three values: A, B, or C (trinary encoding). Assume also that impedance 254 can have any of these three values. As a result, nine different games can now be represented by the electrical signatures AA, AB, AC, BA, BB, BC, CA, CB, and CC (3×3). In like manner, the EVM contacts 212-216 in combination with the ticket connections 230-234 and impedances 246-250 provide the microprocessor 266 with electronic signatures that can encode a maximum of 8 possible prize levels associated with each of the different game types if a binary encoding technique is employed. The use of trinary encoding would permit a maximum of 27 different prize levels. [ibid]

Figure 2:
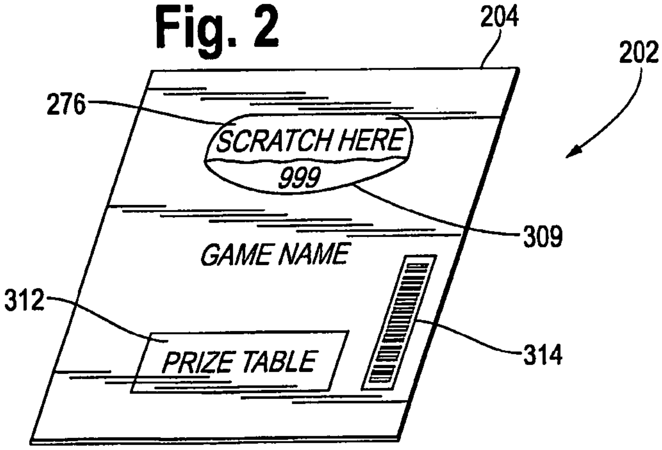
FIG. 2 is a front plan view of a first game card or lottery ticket for use with the electronic validation machine of FIG. 1.
Figure 3:
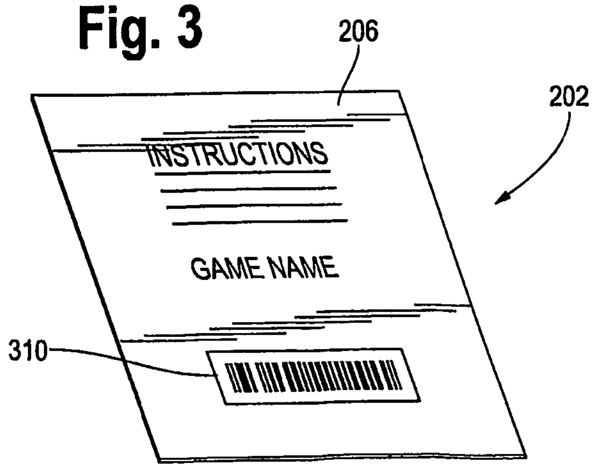
FIG. 3 is a back plan view of the lottery ticket of FIG. 2.

In one of the operations of this particular embodiment, the microprocessor 266 through the contact 222 examines the ticket 202 for the presence of an additional electronic signature produced by the impedance 256. The value of the impedance 256, usually a resistor, can be altered by scratching a scratch-off coating 276 applied over the impedance 256 on the ticket 202 as shown in FIG. 2. This technique permits the microprocessor 266 to determine the status of the ticket 202, that is: whether the ticket 202 is played or unplayed in one embodiment. In this example, the removal of the impedance 256 in effect stigmatizes the ticket 202 so that it cannot be played again. Moreover, it will be appreciated that the use of player-alterable electronic signatures such as impedance 256 has many possible uses including selecting game variables, selecting game types, selecting game play pieces, selecting game branch points, and so forth. In addition, one of the impedances 246-258 can serve as a parity bit that can be, for example, related to the game type or prize level in order to reduce reading errors or possible forgeries of the ticket 202.

In this embodiment, several additional ports of the microprocessor 266 are connected, preferably via a heat sealed flexcable 278, to a liquid crystal display (LCD) 280. This connection can also be made using a Zebra elastomeric connector or a set of mechanical pins. In this example, special LCD drive electronics are built into the microprocessor 266. While there are a number of different displays that can be employed, an LCD is preferred for this example 280 due to low power consumption. Here, the LCD 280 can provide visual feedback to the player by indicating game options, game outcome, total points, games remaining, win/lose results and the like. Likewise, a variety of LCD types are possible including color, monochrome, dot-matrix, 7 segment characters, 16 segment characters, custom characters/icons and any combination and mix of any of the different types.

With reference to FIGS. 1 and 4, it is possible to also include on the EVM 200 a set of pushbuttons 282-286 that can be used by the player to input data to the microprocessor 266 in the process of playing the game(s). In the example shown, a pair of input ports 288 and 290 in combination with pushbuttons 282-286 and a pair of diodes 292 and 294 permit three inputs to the microprocessor 266. As shown in FIG. 4, the pushbuttons 282-286 are all normally open and pull down resistors (not shown) internal to the microprocessor 266 result in logic 0 inputs to ports 288 and 290. Pressing pushbutton 282 connects the anode of the battery 262 to the port 288 and produces a logic 1 input that is subsequently read and decoded by the microprocessor 266 as a player input. In a like manner, pressing pushbutton 286 produces a logic 1 input to port 290. The diodes 292 and 294 produce logic 1 inputs to both ports

288 and 290 simultaneously when pushbutton 284 is pressed. It will be appreciated that the pushbuttons 282-286 can be any one of a number of configurations including but not limited to conductive ink membranes, conductive disks attached to silicone rubber buttons, flexible metal contacts, capacitive pickups, variable resistance contacts, etc. with or without tactile feedback. Moreover, the number of pushbuttons is not limited to three, as indicated by an additional set of pushbuttons 296 and 298 shown in FIG. 1 and can also use binary coding or matrix encoding or variable impedance encoding depending upon the particular design criteria of a game and of the EVM 200.

As shown in FIGS. 1 and 4, a sound capability can be included as an additional feature to the EVM 200. In this embodiment, an audible sound is generated using a loudspeaker 300 in conjunction with a bridge amplifier 302 and an analog signal formed at a port 304 of the microprocessor 266 produces a current signal which develops a voltage across a resistor 306. The analog information is stored as words or bytes of digital data stored in an internal memory of the microprocessor 266 and input to a digital to analog converter also contained in the microprocessor 266. Then the digital to analog converter outputs a current to the port 304 having a value proportional to the digital data. The resistor 306 operates to convert the current to a voltage that is amplified at 302 and applied to the loudspeaker 300. In this embodiment, the amplifier 302 is a bridge type amplifier that produces the sound pressure level from speaker 300. As a further feature a port 308 of the microprocessor 266 can be used to generate a control signal that places the amplifier 302 in a low power standby mode to conserve battery power. This arrangement as described will provide adequate volume and fidelity from the speaker. However, many other sound generating circuits can be used including circuits that employ single ended amplifiers or single transistor amplifiers, or even a direct connection of the 300 speaker to the microprocessor 266. In addition, the embodiment shown does not preclude other methods of producing sound including the use of pulse width modulation signals, computer generated tones or musical sounds, buzzers, piezo devices, or headphones. Likewise the embodiment shown does not imply that sound must be used. It is possible through the use of the port 308 signal to mute the audio just as it is possible to cause the microprocessor 266 to generate no audio signal at the port 304. Further, the microprocessor 266 can be instructed via electronic signatures read from the ticket 202 or input signals from the pushbuttons 282-286 (or 296-298) to mute the audio.

Depending on various circumstances including cost and applications implemented, other modifications of the system shown in FIGS. 1-4 can be made. For instance, the battery 262 can be a non-chargeable or chargeable as well as being user-replaceable or non-replaceable. The microprocessor 266 or its equivalent can use internal or external LCD drive electronics. Likewise, the microprocessor 266 can use internal or external program and data storage memory and the memory can be volatile or non-volatile, one time programmable or many times programmable or physically removable or non removable. In other embodiments, the EVM 200 or microprocessor 266 can contain an external port or ports 320 that permit the memory to be programmed from a personal computer or lottery terminal. The ports can be of the direct connection type or wireless type using RF, current loop, capacitive pickup, or light including infra-red.

Various alternatives, enhancements and operations of the system described above in connection with FIGS. 1-5 are described below. In one embodiment related to an instant lottery type application, the prize information is encoded in the ticket 202 conductive ink jumpers 246-250 generally as described above. In one arrangement, printed under the scratch-off coating 276 is a validation or ticket identification number indicated by a broken line 309 that can be used to validate the ticket 202. Along with initiating operation of the EVM 200 as described above, scratching off the coating 276 can also have the effect of stigmatizing the ticket 202 against further play. For example, and as discussed above the conductive ink forming one or more of the impedances 246-258 can be formed with the scratch-off coating 276 so that at least a portion of it is removed when the coating 276 is scratched off by the player. To facilitate scratching off the coating 276, the EVM can be configured with a planer portion 311 located adjacent to and below the slot 208 so that the portion of the ticket 202 including the scratch-off coating is supported when the ticket 202 is inserted in the slot 208. The process of sensing by the EVM 200 that the scratch-off coating 276 is first intact and then destroyed can serve the dual purpose of both stigmatizing the ticket and protecting against unscrupulous lottery ticket retailers prescreening tickets for high-tier winners.

In addition, the ticket 202 can include a barcode 310 printed on the back surface 206 of the ticket 202 as shown in FIG. 2 or on the back surface 206 of the ticket 202. In this case the barcode 310 includes ticket validation information and can be in the traditional lottery interleaved Two-of-Five (I2of5) format with an associated validation number. In this embodiment, the barcode 310 is synchronized with the impedances 246-256 so the two agree on the prize amount and can be used to validate the ticket in the event that, in this particular example, the results of a game displayed on the display 280 indicate that the game was a winner as suggested by a prize table 312 printed on the front 204 of the ticket 202. Also, the game play information can be contained in a second, encrypted, barcode 314 for example on the front surface 1204. This play information may include such things as the game to be played, the prize level of the ticket 202, and at least a portion of the validation number. In one application, a bar code reader 316 located in the EVM 200 can read the barcode 314 prior to playing the game encoded in the ticket.

Figure 6:
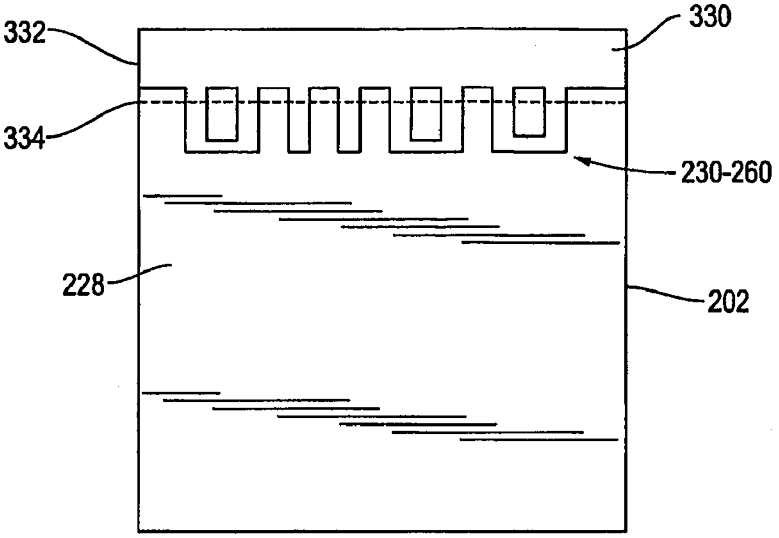
FIG. 6 is a plan view of the substrate of the lottery ticket of FIG. 2 with a first circuit shorting mechanism.

FIG. 6 depicts one configuration of the substrate 228 of the ticket 202 designed to reduce potential fraud including ticket picking. In this embodiment, some or all of the conductive elements 230-260 are connected to a conductive shorting bar 330 that is printed on a perforated tab 332 that is attached to the ticket 202 by a perforation 334. Removal of the tab 332 will allow the player to insert the ticket 202 into the EVM 200 for play.

Figure 7A:
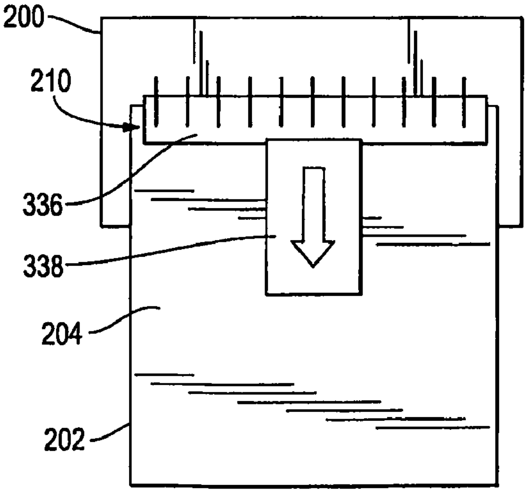
FIGS. 7A and 7B are plan views of the substrate of the lottery ticket of FIG. 2 with a second circuit shorting mechanism.
Figure 7B:
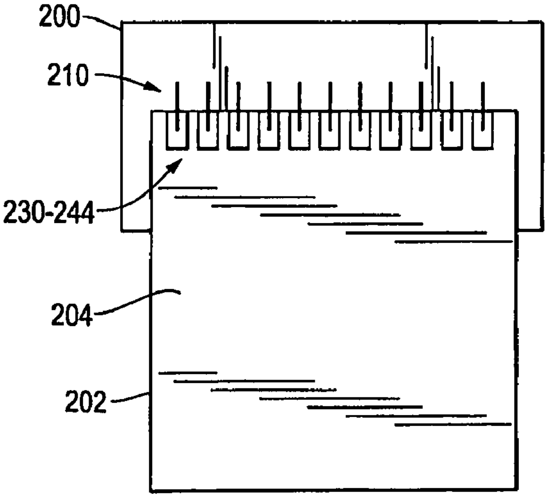

FIGS. 7A and 7B depict another configuration of the ticket 202 designed to reduce potential fraud including ticket picking. In this embodiment, some or all of the EVM's connector or contacts 210 are in contact with a shorting bar 336 having a tab portion 338 where the shorting bar 336 is attached to the surface 204 of the ticket 202. Pulling on the tab 338 will remove the shorting bar 336 resulting in electrical contact between the contacts 210 and 230-244 thereby permitting the ticket 202 to be played.

As a result in an instant lottery type embodiment of the system described above, a player can use the ticket 202 to activate the EVM 200, play a computer style game, and possibly win a prize predetermined by the ticket 202. Preferably, the computer games will have a predetermined outcome or result. By having a predetermined outcome, it makes it possible in lottery applications of the system to construct a prize structure for a particular game or set of games where, for example, books of the tickets 202 are printed with a predetermined number of winners. One of the capabilities of the system is to allow a player to play an interactive game using the push buttons 282-286 and the result of the game will be the same no matter which buttons are pushed. Programming techniques for such illusion of skill type games are well known and described for example in U.S. Pat. No. 4,582,324. Such games as bowling or blackjack can be implemented using this technique. It is also possible to provide additional circuits, some scratchable and some not, located on the ticket 202 that can be used for a variety of functions including starting the game, ending the game, changing the game's play sequence, and even serving as pushbuttons to provide additional control capability.

Due to the fact that this embodiment of the system permits standardized EVM hardware and software manufacturing, all EVM devices 200 can be substantially identical, with the differences in games and play determined by the instant ticket 202. As a result, this embodiment has the advantages of: eliminating the logistical complexity of handling seeded EVMs; reducing the costs of the EVM 200 or electronic cards; and changing the economics of electronic card sales in that one EVM 200 can play several different types of games actuated by multiple different instant tickets 202 thereby in certain applications allowing the EVM 202 to be sold at low cost or even given away. Thus, the player activated EVM 202 and associated custom tickets 202 can build on the instant ticket product by offering dynamic game action and even sound to correspondingly enhance the player experience and perceived value. Moreover, because the game is contained within an electronic memory associated with the EVM 200, the playtime and thus perceived value of the game can be increased far beyond the capability of a standard scratch ticket to support. Instant tickets measuring 3×3 inches, as an example, could produce a game that lasts for several minutes. That feature combined with game graphics displayed on the display 280 and associated EVM sound 'bites' can also make the game a multi-media experience. Winning plays can be announced both visually on the display 280 and audibly on the speaker 300. Additional capabilities can include physically modifying the ticket 202 so as to allow scratching of additional areas on the ticket 202 during game play to add another dimension to the game.

In another embodiment, the use of programmable memory or external memory pods such as a plug-in-memory 318 as depicted in FIGS. 1 and 4 can permit the player to personalize his EVM 200 so that it contains, for example, only preferred game types or prize levels. Contents of the EVM 200 can thus be modified at the point of sale, for example, to include the player's favorite numbers or purchase record, or name and password to provide player allegiance information or provide gifts or coupons based upon the record of purchases. In addition, the multi-media capability of the EVM 200 can also provide an opportunity to display local advertisements or announcements for a player or a region unique parameter.

Also in lottery applications, because the EVM 200 in the embodiment described above is not a gambling device per se, in this case the instant ticket 202 can be considered the gambling component, sales of the device may avoid limitations associated with standard lottery tickets. For example, the EVM 200 can be sold anywhere containing only conventional games of skill such as the video game Tetris and the owner can then purchase instant tickets 202 at the conventional lottery outlet to play gambling style games. This characteristic of the EVM 200 permits downloading games from a personal computer 320 or over the Internet, for example.

Furthermore, specially programmed tickets or cards 202 can be used to provide an activation code for the EVM 200. For example, an activation card can include a barcode such as the barcode 310 containing an encrypted activation code. The barcode 310 would be read and decrypted at the point of sale and used to generate a sales slip containing a multi-digit activation key, which is synchronized with the card 202. When the activation card 202 is inserted into the slot 208 of the EVM 200, the information contained on the activation card 202 is read by the EVM 200 and used, as a key to determine if the activation key data entered by an EVM keypad is correct. Theft of EVMs 200 would thus be discouraged since the stolen unit would not function without the sales receipt.

FIGS. 8-12 illustrate another embodiment of a player activated game system. In the preferred structure of this embodiment, an EVM 350 is configured with an upper printed surface 1352 that, in this case, replicates a traditional game card or lottery ticket. The EVM 350 includes a housing 354, a bottom portion 356 and a pair of guide members 358 and 360 for receiving and retaining the ticket 352 within the EVM 350. In some applications the ticket 352 can be purchased separately from the EVM 350 and inserted by a player or the EVM 350 and ticket 352 can be sold as an assembled unit. In any event, the EVM 350 can also include a display 362, preferably an LCD display unit, and with particular reference to FIGS. 10 and 11, a printed circuit board 364 secured to the bottom portion 356. Integrated with the circuit board 364 is a microprocessor or computer, indicated by 366 in FIGS. 11 and 12, operatively connected to the display 362 by any convenient method such as a flexcable 368. A battery 370 is provided to supply power to the EVM 350. In this embodiment, a pressure sensitive switch indicated at 372 is also integrated into the circuit board 364. In the preferred embodiment, the switch 372 includes conductive carbon applied to a plastic membrane located above the circuit board 364 that is effective to complete a circuit between the battery 370 and the microprocessor 366 although other types of switches can be used including the FET 1268. In this particular embodiment, the ticket 352 includes a scratch-off coating 374 applied over a set of indicia 376 printed on the ticket 352. Here, the player following the printed instructions on the scratch-off coating "SCRATCH TO PLAY" removes the coating 374 and pushes where indicated by the indicia 376 which can have the effect of applying power to the microprocessor 366. This type of arrangement including the switch 372 can also be used to control the game or games programmed in the microprocessor 366. Other mechanisms can also be used to activate the EVM 350 including a pull-tab arrangement 394 of the type described in connection with FIG. 16.

Figure 11:
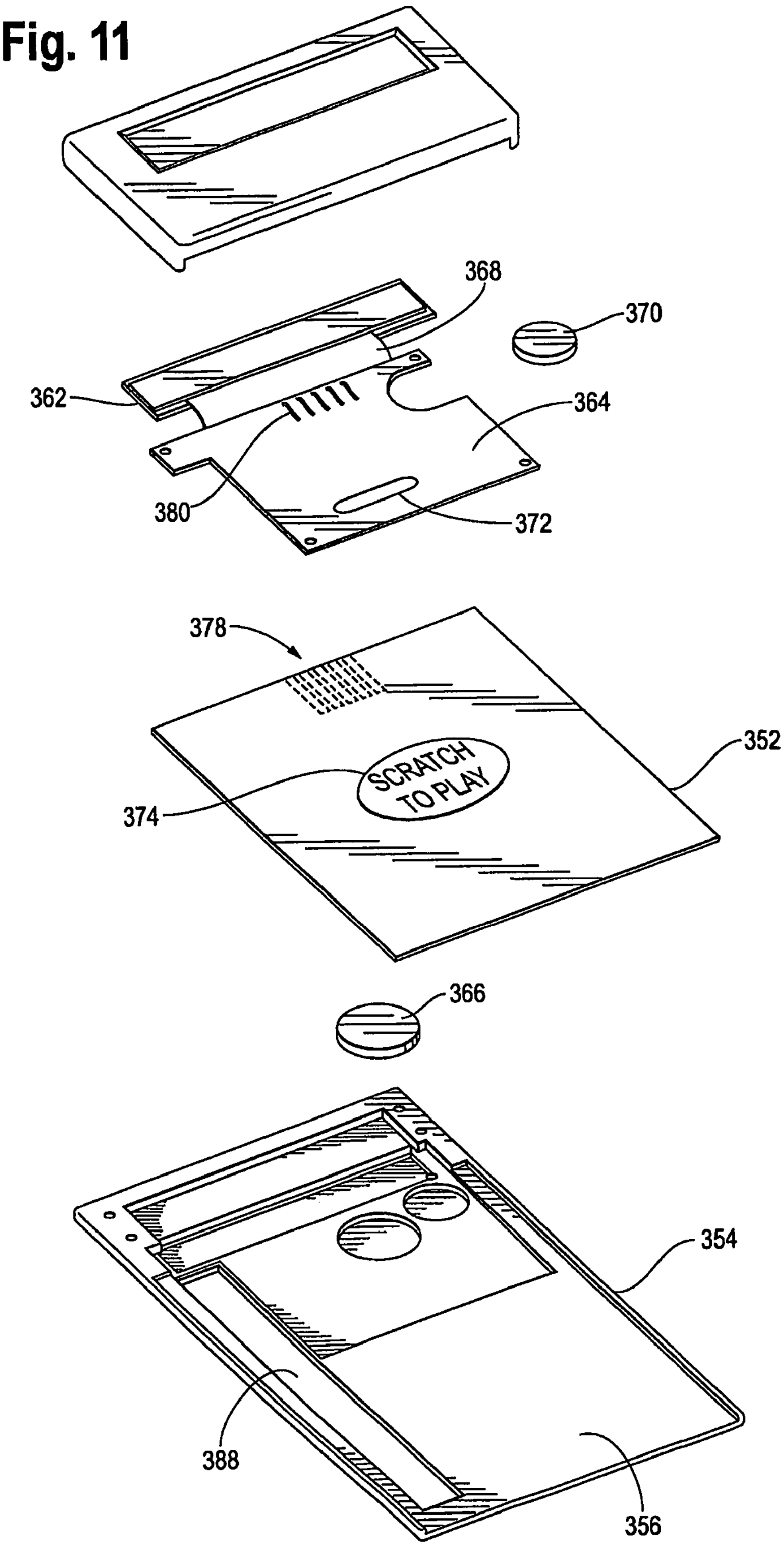
FIG. 11 is a exploded view of the electronic validation machine of FIGS. 8 and 9.

Similarly to the ticket 202 shown in FIG. 5, the ticket 352 preferably includes a set of printed circuit elements of the type 230-260 and generally indicated at 378 in FIG. 11 in phantom form. In the preferred embodiment of the system including the EVM 350 and the ticket 352, the printed elements 378 are used to represent a predetermined prize level and other information in the same manner as the circuit elements 230-260 printed on the ticket 202 described above.

Figure 12:
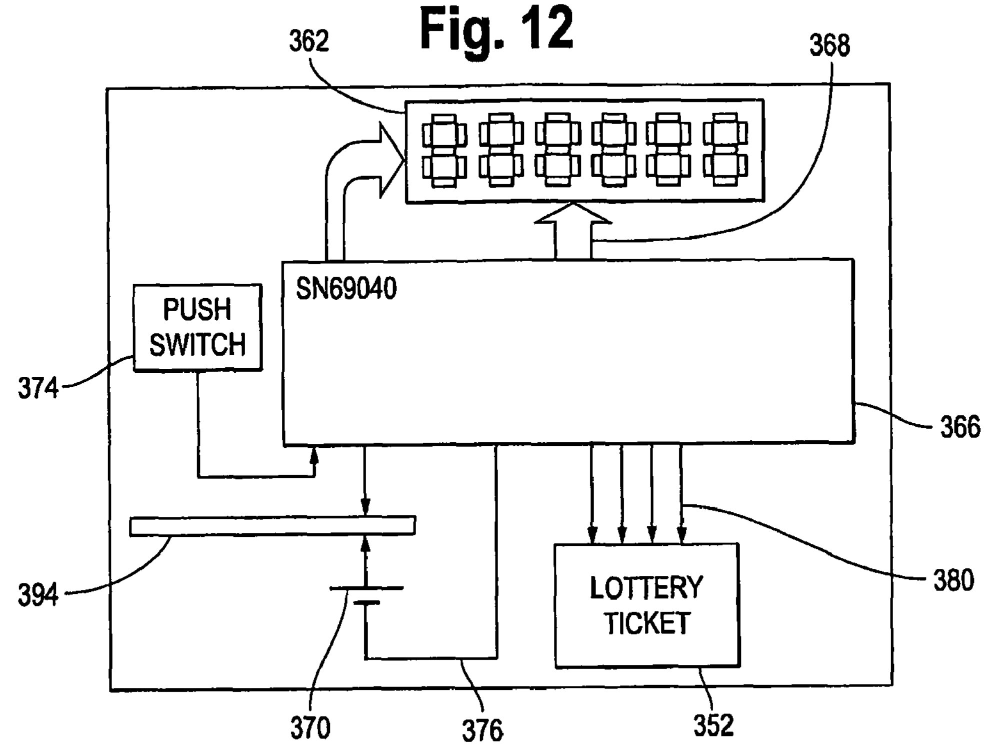
FIG. 12 a block diagram of the components of the electronic validation machine of FIG. 8.

As shown in FIGS. 11 and 12, in order to provide an electrical connection of the circuit elements 378 to the microprocessor 366, a set of connector pins 380 is secured to the circuit board 364 and electrically connected to the microprocessor 366. When the ticket 352 is fully inserted or positioned in the EVM 350 as shown in FIG. 8, the pins 380 will make electrical connections with the circuit elements 378 thereby permitting the information contained in the circuit elements 378 to be transmitted to the microprocessor.

Figure 13:
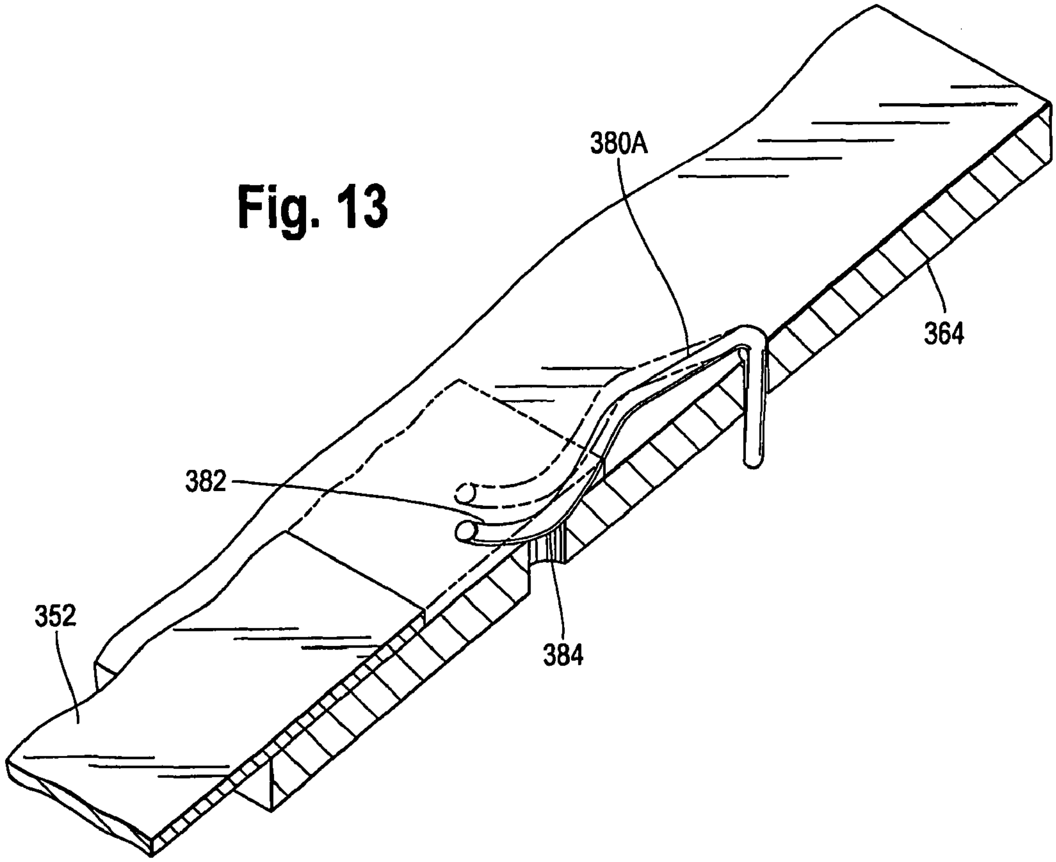
FIG. 13 is a side view of a first spring connecter for use with an electronic validation machine of the type shown in FIG. 8.
Figure 14:
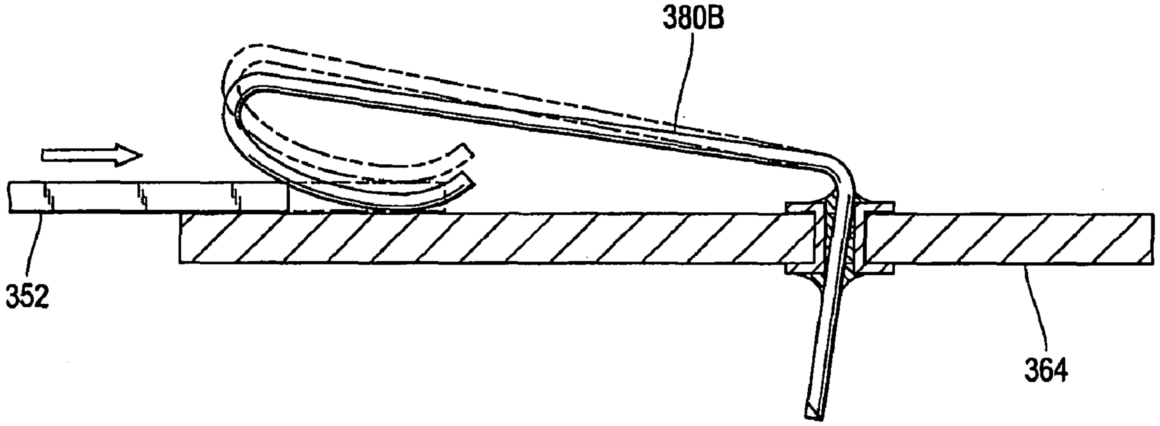
FIG. 14 is a side view of a second spring connecter for use with an electronic validation machine of the type shown in FIG. 8.
Figure 15:
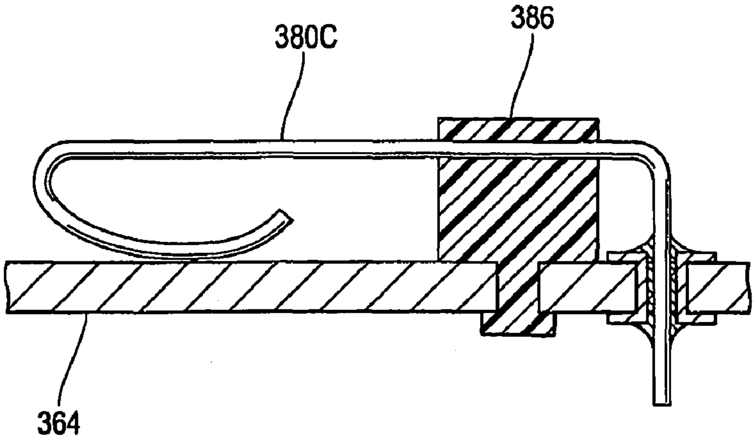
FIG. 15 is a side view of a third spring connecter for use with an electronic validation machine of the type shown in FIG. 8.

FIGS. 13, 14 and 15 illustrate embodiments of the pins 380. In one embodiment of the pins 380 shown in FIG. 13, an example of a pin 380A is configured with a curved portion 382 with a lower portion that normally resides in a hole or other indentation 384 configured in the circuit board 364. In this arrangement, the pins 380A due to a biasing or spring action are additionally effective to retain the ticket 352 in the EVM 350 and at the same time to permit insertion of the tickets 352 into the EVM 350 either at the time of manufacture or by a player. To increase the biasing force retaining the ticket 352 in the desired position on the circuit board 364, the angle between the portion of the pin 380A inserted in the circuit board 364 and the portion connected to the curved portion 382 is preferably 90 degrees or less. In a second embodiment depicted in FIG. 14, one end of a pin 380B is inserted at an angle into the circuit board 364 and the other end is curved downwardly to provide a retaining force on the ticket 352. In a third embodiment a pin 380C is shown in FIG. 15 which is similar to the pin configuration 380B. In this embodiment, however, the pin 380C extends perpendicularly through the circuit board 364. To aid in retaining and aligning the pins 380C on the circuit board 364, the pins are secured together by a plastic alignment strip 386.

Figure 8:
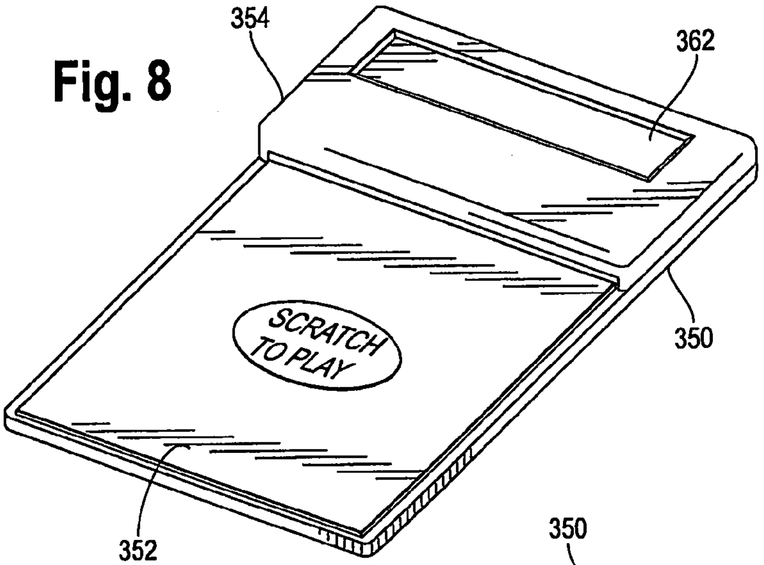
FIG. 8 front view of a second player activated electronic validation machine with an associated game card.
Figure 9:
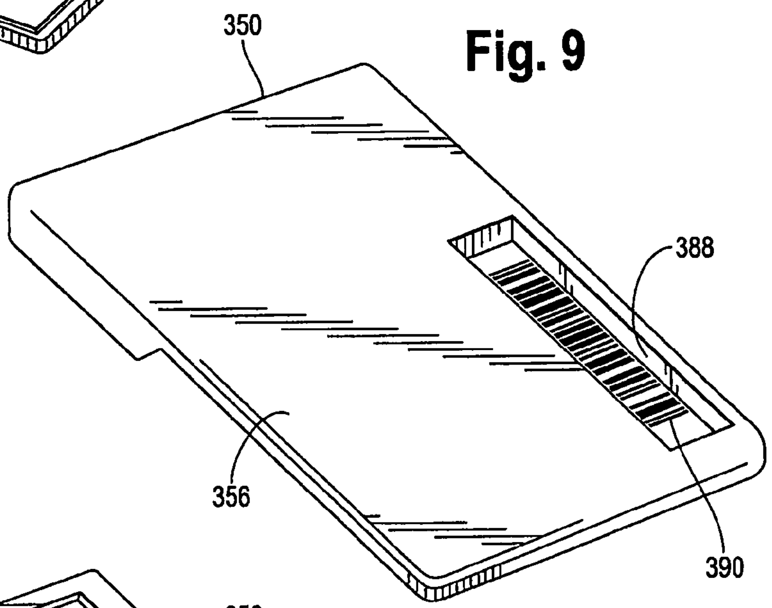
FIG. 9 is a rear view of the electronic validation machine of FIG. 8.
Figure 10:
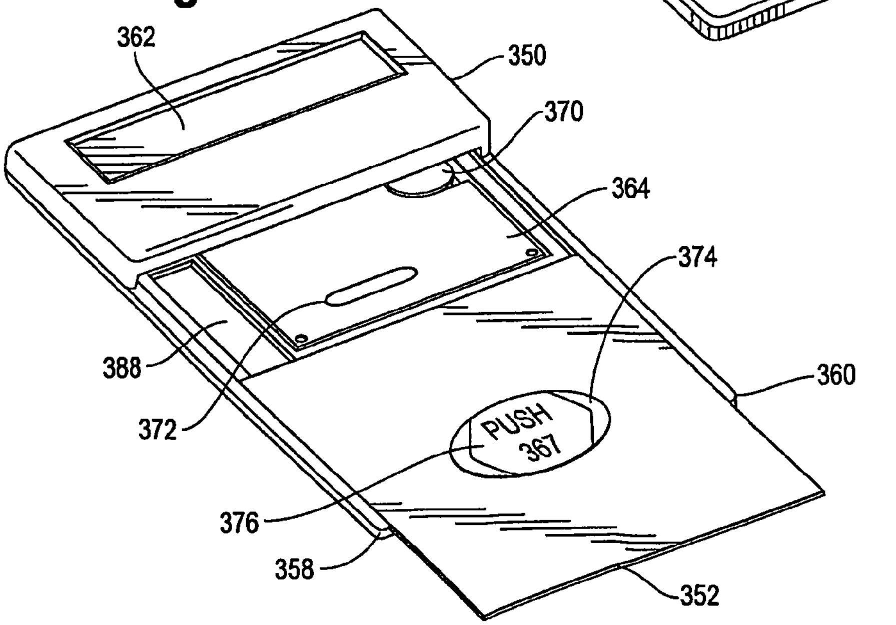
FIG. 10 is a front perspective view of the electronic validation machine of FIGS. 8 and 9 with a game card partially inserted.

Another aspect of the EVM 350 as depicted in FIGS. 8-10 is that the EVM 350 can be configured with an aperture 388 in the bottom portion 356 of the housing 354. In this embodiment, the aperture 388 is in registry with a barcode 390 printed on the bottom surface of the ticket 352. Here, the barcode 390 can contain validation and inventory information much like a conventional instant lottery ticket. Preferably, the barcode 390 will include information relating to the prize value of the ticket 352 and thus it will be functionally related to the information contained in the conductive elements 378. Thus for instance, a winning game programmed on the ticket 1352 can be validated in the same manner as a conventional instant lottery ticket, for instance, by a lottery agent using an agent terminal.

Figure 16:
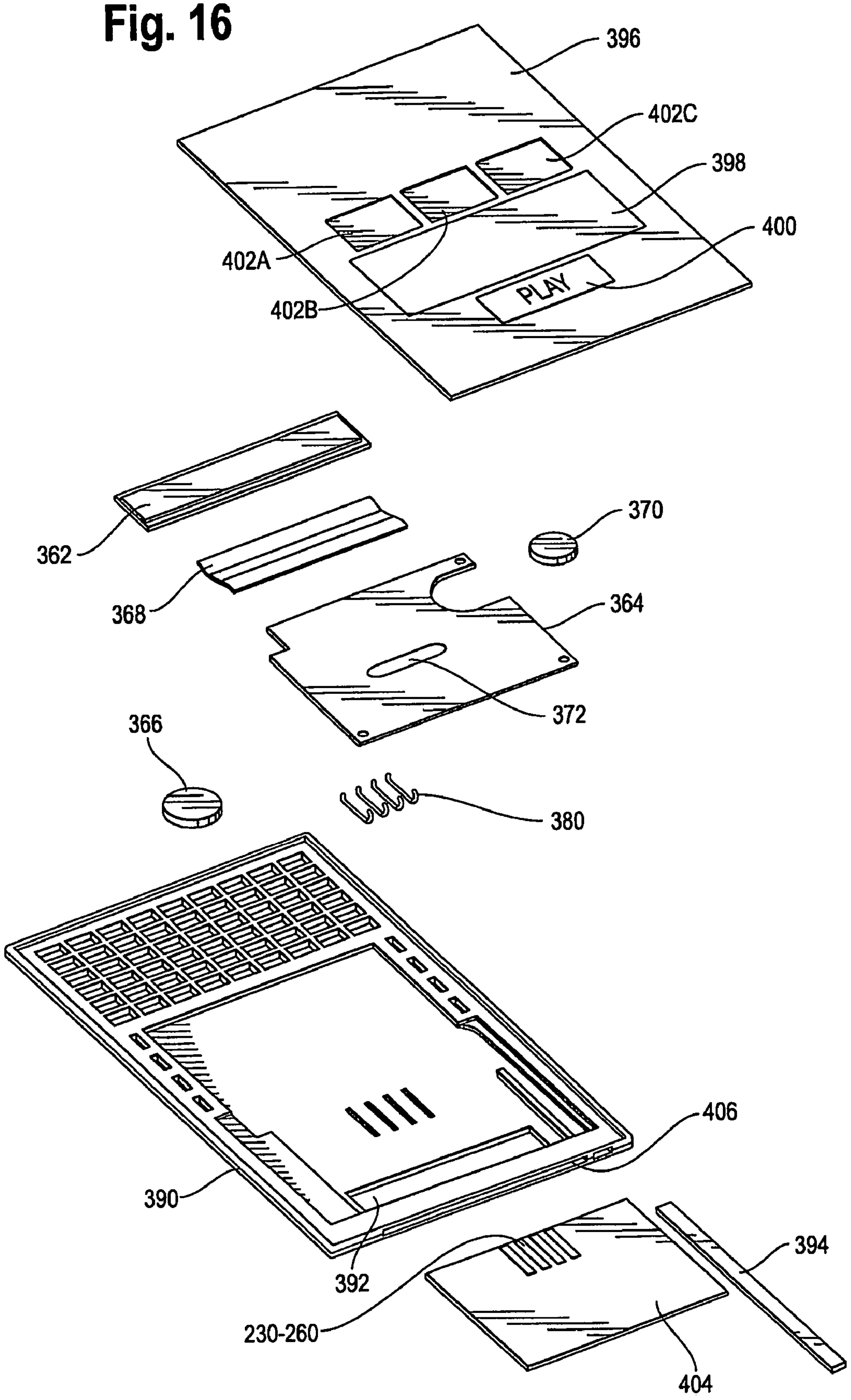
FIG. 16 exploded view of a third player activated electronic validation machine with an associated game card.

FIG. 16 illustrates a further embodiment of a player activated game system. This embodiment can include several of the same basic components as the embodiment shown in FIG. 11 such as the display 362, the printed circuit board 364, the microprocessor 366, the cable 368, the battery 370, the player operated (carbon) switch 372, and the contact pins 380, that in this embodiment are contained in a housing 390, preferably formed from plastic. As with the housing 354, the housing 390 can include an aperture 392 for reading a barcode printed on a game card. In this embodiment, a pull tab 394 can be used to connect the battery 370 to the microprocessor 366 as illustrated in the block diagram of FIG. 12. Secured over the components 362-372, 380 and 394 is a printed game identification card 396. In this embodiment that replicates in form a conventional instant lottery ticket, the identification card 396 includes a pay table 398 and a printed push button 400 located over the switch 372. In addition, this example of the identification card 396 is configured with three apertures or windows 402A-402C located in registry with the display 362 such that the results of the game programmed in the microprocessor 366 can be observed by the player. Preferably, the identification card 1396 is printed on a paper substrate in the same manner as a conventional instant lottery ticket but other materials can be used such as plastic to form the identification card 1396. To program this embodiment with a predetermined result or payout according to, for example, the pay table 398, a programming card 404, preferably printed with electronic circuit elements such as the elements 230-260, can be inserted into a slot 406 in the housing 390 where the contact pins 380 will make contact with the contacts 230-244 printed on the card 404. In one lottery application of the embodiment shown in FIG. 16, the basic machine including the housing 390, the printed circuit board 364 and the microprocessor 366 programmed with one or more games can be mass produced in one location. Then sets of the programming cards 404 can be printed in another location where, for instance, each set or book of the cards 404 defines a prize structure for a particular lottery game.

Figure 17A:
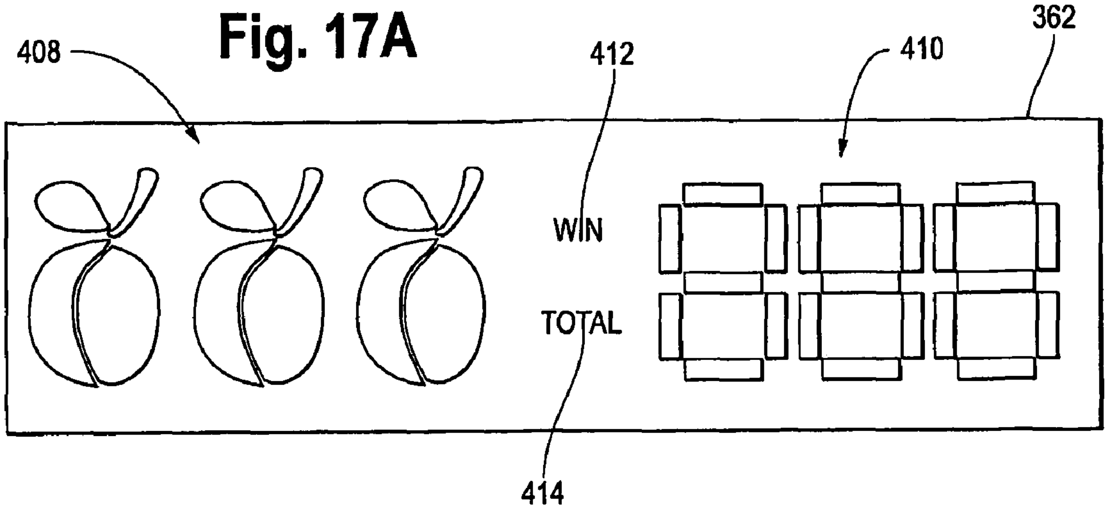
FIGS. 17A, 17B and 17C are depictions of displays of potential game outcomes displayed by an electronic validation machine of the type shown in FIG. 93.
Figure 17B:
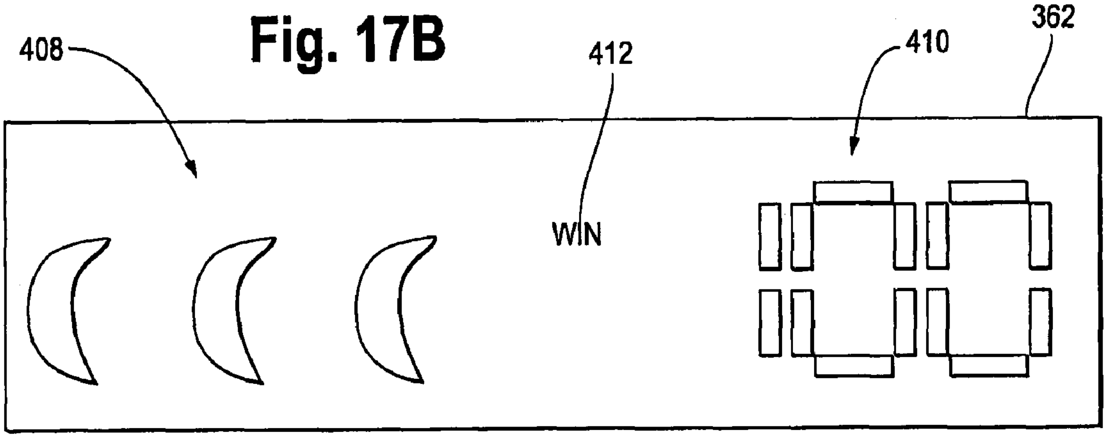
Figure 17C:
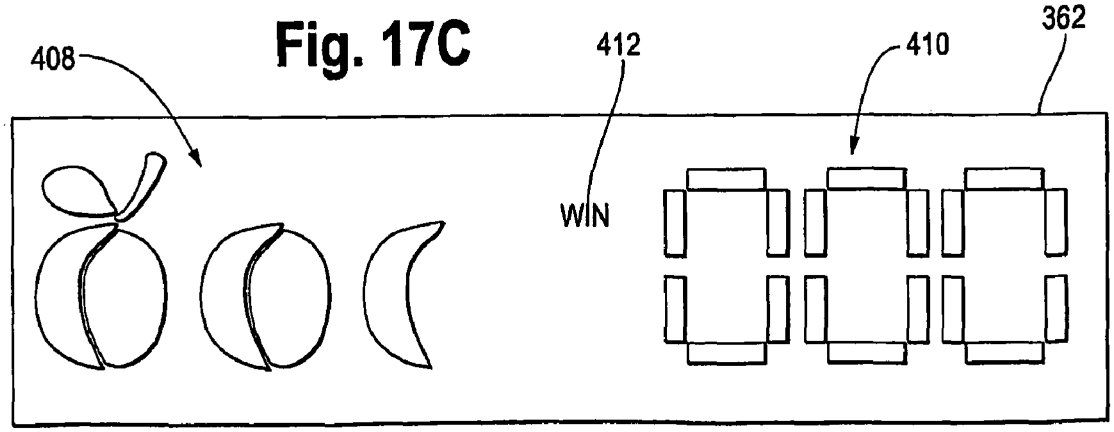

There are a plurality of displays that may be used with the EVMs described above. FIGS. 17A-17C provide a graphic illustration of one type of display 280 or 362 for one of many types of games that can be played on the various embodiments of the player activated game systems shown in FIGS. 2-16. In this example which replicates a standard casino type slot machine, the display 362 is an LCD having a total of 35 display elements where 12 elements indicated generally at 408 can be used to display several varieties of fruit (banana, apple, orange, cherry, lemon) which in FIG. 17A are three apples. Another 21 display elements indicated generally at 410 can be used to display three numerical digits and a pair of display elements 412 and 414 can be used to display a "WIN" display and a "TOTAL" display respectively. The slot machine game can be implemented on, for example, the embodiment shown in FIG. 16 where, as indicted on the game identification card 396, the game unit or lottery ticket of FIG. 16 can be purchased for $25.00 and each simulated handle pull in the game is equivalent to $1.00 thus giving the player a simulated twenty handle pulls. After applying power to the microprocessor 366 and LCD display 362 by removing the pull tab 394, the player can use the carbon switch 372 to, in effect, pull the handle of the slot machine. As shown in FIG. 17B, one outcome of the game can be three bananas displayed on the elements 408 with the digits 410 indicating that these symbols are worth $100. Another outcome is shown in FIG. 17C where three different types of fruit are displayed by the elements 408 and the digits 410 indicate that the value of this pull is zero. Although not shown, the TOTAL display 414 can be used by the microprocessor 366 to periodically display on the digits 410 the cumulative total of the wins and after twenty such pulls can display the total or winning value of the game. In the preferred embodiment of this game as well as other multiplay games, at least one winning pull or play is programmed into each programming card 404 so as to enhance player interest. Also, to maintain player interest, the game programmed in the microprocessor 366 can use a random shuffle seed to randomize losing pulls or other game outcomes so that it does not appear to players purchasing multiple game systems of the type shown in FIGS. 1-16 that all the games are programmed the same way. There are a plurality of methods that may be used to generate the random seed. One such method comprises counting clock pulses in an accumulator starting with removal of the pull-tab 394 and ending with the first depression of the carbon button 372.

As a result, by using programming cards of the type 404 or tickets of the type 202 and 352, it is possible to manufacture a large number of identical electronic game playing devices, yet structure the outcomes of the games, that will appear to the players to be random, into a predetermined prize structure.

We claim:

1. A game apparatus for play of an instant lottery game comprising:

a standardized hand-held electronic game device including a computer, a display operatively connected to said computer, a game card interface operatively connected to said computer, and at least one instant lottery game programmed in said computer;

a game card representing a single lottery game play, said game card adapted for connection with said interface wherein connection of said game card to said interface permits a player to initiate play of said game, said game card comprising game information required by the lottery game programmed in said computer to initiate and complete a single play of the lottery game, the game information including a type of game to be played, whether the game play is a winner, and respective prize award for the single lottery game play, wherein the display and outcome of the lottery game is presented to the player via said display and only after connecting said game card with said game card interface;

wherein said game information on said game card is encoded in printed conductive elements which include at least one impedance;

said game device having a standardized hard-wired configuration that responds to and decodes an electronic signature generated by the various patterns of said printed conductive elements including the at least one impedance so as to conduct the particular lottery game contained by said game card, including game outcome and prize award indication, based solely on the configuration of said printed conductive elements on said card without retrieval of other game information particular to said game card; and wherein the outcome of said game is predetermined solely by said encoded information on said game card, is not stored in or downloaded to said game device, and is not known by the player until played on said electronic game device and is not changed by any subsequent play of the game with said electronic game device.

2. The apparatus of claim 1 wherein said predetermined outcomes are prize amounts.

3. The apparatus of claim 1 wherein said computer is configured for play of a plurality of different types of lottery games and is programmed with a plurality of different programs to initiate and complete the different types of lottery games and said information on said game card includes the identification of a specified one of said games to which the game card applies.

4. The apparatus of claim 3 wherein said information is printed on said card in conductive ink.

5. The apparatus of claim 4 wherein said predetermined game outcome is represented by one or more impedances printed in said conductive ink and said computer is effective to determine the electronic signature of said impedances when said game card is connected to said interface.

6. The apparatus of claim 4 wherein said card additionally includes a barcode including data functionally related to said information.

7. The apparatus of claim 5 wherein said electronic signatures are a measure of the resistance of said impedances.

8. A lottery game apparatus for play of a plurality of different lottery games by a plurality of users, comprising:

a plurality of standardized hand-held electronic game devices each including a computer, a display operatively connected to said computer, a game card interface operatively connected to said computer, and wherein each of said devices includes a plurality of different types of lottery games programmed in said computer;

a plurality of game cards wherein each of said cards is for play of a single one of said lottery games and includes data required by said electronic game devices to initiate and complete a single play of a respective one of the lottery games, including data that instructs said computer as to a particular game to be played, the outcome of the game, and the prize award for the game, wherein the display and outcome of the lottery game is presented to the user via said display and only after connecting said game card with said game card interface, said data is printed in the form of circuit elements on said cards in conductive ink which includes at least one impedance;

said game devices having a standardized hard-wired configuration that responds to the data generated by the various patterns of said printed circuit elements including the at least one impedance so as to conduct a plurality of different types of games, including outcome and prize indication, based solely on the configuration of said printed circuit elements on a respective game card without retrieval of other game information particular to said game card;

wherein each of said cards has a predetermined game outcome that is dictated solely by said data on said card, is not retrieved by the game device from memory or downloaded to the game device, and is not known to the user until displayed on said display and is not changed by any subsequent play of the game with the electronic game devices; and wherein said cards are adapted for connection with said interface thereby permitting a player to initiate play of said game on said device resulting in said computer generating said predetermined outcomes dictated by said data on said card connected to said interface and wherein said outcome is displayed on said display.

9. The apparatus of claim 8 wherein said computer applies power to said circuit elements through said interface and determines the electrical signatures of said circuit elements.

10. The apparatus of claim 8 wherein said cards additionally include a barcode containing information functionally related to said data.

11. The apparatus of claim 8 wherein said interface is configured to permit a player to insert said cards into said device and to make an electrical connection between said data and said computer.

12. The apparatus of claim 8 wherein said device includes a switch operatively connected to said computer and aligned with a predetermined position on said cards wherein said switch is effective to permit a player to play said game.

13. The apparatus of claim 8 wherein said cards include a scratch-off coating applied over at least a portion of said conductive elements wherein removal of said scratch-off coating by a player alters said conductive elements.

* * * * *